(12) United States Patent
Kenbayev et al.

(10) Patent No.: US 12,689,503 B2
(45) Date of Patent: Jul. 21, 2026

(54) METHOD FOR DETERMINING A QUANTUM COMMUNICATION SETUP, QUANTUM COMMUNICATION SETUP, COMPUTER PROGRAM, AND DATA PROCESSING SYSTEM

(71) Applicant: Terra Quantum AG, St. Gallen (CH)

(72) Inventors: Nurbolat Kenbayev, St. Gallen (CH);
Asel Sagingalieva, St. Gallen (CH);
Pavel Sekatski, St. Gallen (CH);
Alexey Melnikov, St. Gallen (CH)

(73) Assignee: Terra Quantum AG, St. Gallen (CH)

( * ) Notice: Subject to any disclaimer, the term of this patent is extended or adjusted under 35 U.S.C. 154(b) by 676 days.

(21) Appl. No.: 17/822,517

(22) Filed: Aug. 26, 2022

(65) Prior Publication Data

US 2023/0090688 A1     Mar. 23, 2023

(30) Foreign Application Priority Data

Sep. 14, 2021     (EP) .................................... 21196667

(51) Int. Cl.
*H04L 9/08*        (2006.01)
*G06N 10/60*       (2022.01)
(52) U.S. Cl.
CPC ........... *H04L 9/0852* (2013.01); *G06N 10/60* (2022.01); *H04L 9/0819* (2013.01)
(58) Field of Classification Search
CPC ... H04L 9/0852; H04L 9/0855; H04L 9/0858; H04L 9/08; H04L 9/085; G06N 3/092;
(Continued)

(56) References Cited

U.S. PATENT DOCUMENTS 11,237,807 B1 *  2/2022  Rao ..................... G06F 11/3409
12,088,707 B2 *  9/2024  Huang ................. H04B 10/541
(Continued)

FOREIGN PATENT DOCUMENTS

CN      107612688 A      1/2018
CN      112491536 A  *  3/2021  ............. H04B 10/70
(Continued)

OTHER PUBLICATIONS

Korean Patent Application No. 10-2022-0113514, Office Action (Apr. 29, 2024).
(Continued)

*Primary Examiner* — Tae K Kim
(74) *Attorney, Agent, or Firm* — Fitch Even Tabin & Flannery LLP

(57)     ABSTRACT

A method for determining a quantum communication setup includes providing a component set indicative of a quantum communication setup comprising quantum communication components; selecting an action of a set of actions each indicative of a further quantum communication component; including the selected further quantum communication component in the component set; determining, from the component set, a quantum model; determining, from the component set and the quantum model, a maximum key rate by optimizing over an optimization parameter set comprising quantum communication component parameters; adjusting the reward value depending on the size of the maximum key rate in relation to a previous maximum key rate; and iteratively repeating the above steps until a termination criterion is satisfied, yielding an optimal component set and an optimal setup parameter set.

15 Claims, 7 Drawing Sheets

(58) Field of Classification Search

CPC ...... G06N 3/091; G06N 3/098; G06N 3/0985; G06N 3/088; G06N 3/082; G06N 3/08; G06N 10/60; G06N 10/00; H04W 12/041; H04W 12/04

See application file for complete search history.

(56) References Cited

U.S. PATENT DOCUMENTS

| | | | | |
|---|---|---|---|---|
| 2019/0379463 A1* | 12/2019 | Shields | ................. | H04L 9/0852 |
| 2020/0272905 A1* | 8/2020 | Saripalli | ................. | G06N 3/082 |
| 2021/0119788 A1* | 4/2021 | Wang | ................... | H04B 10/272 |
| 2021/0201138 A1* | 7/2021 | Higa | ...................... | G06N 3/092 |
| 2021/0374611 A1* | 12/2021 | Ronagh | .................... | G06N 5/01 |
| 2022/0150060 A1* | 5/2022 | Huang | ................. | H04B 10/541 |
| 2022/0209943 A1* | 6/2022 | Syrivelis | ................. | G06N 10/00 |
| 2022/0303130 A1* | 9/2022 | Qi | ......................... | H04L 9/0852 |
| 2023/0177339 A1* | 6/2023 | Lord | ...................... | H04B 10/70 706/25 |
| 2023/0206110 A1* | 6/2023 | Jiang | .................... | H04L 1/0065 714/10 |
| 2023/0283384 A1* | 9/2023 | Ahn | ...................... | H04B 10/70 398/43 |
| 2023/0299950 A1* | 9/2023 | Ahn | ..................... | H04L 9/0852 714/704 |
| 2023/0305287 A1* | 9/2023 | Namazi | .................. | G06N 3/092 |
| 2024/0193452 A1* | 6/2024 | Lester | .................... | G06N 10/40 |

FOREIGN PATENT DOCUMENTS

| | | | | | |
|---|---|---|---|---|---|
| CN | 113472536 A | * | 10/2021 | | |
| CN | 111400965 B | * | 5/2024 | ............. | G06N 20/00 |
| EP | 3340529 A1 | | 6/2018 | | |
| EP | 4037247 A1 | * | 8/2022 | ........... | G06F 21/602 |
| GB | 2593697 A | | 10/2021 | | |
| IT | 202100006179 A1 | | 9/2022 | | |
| JP | 2022082406 A | * | 6/2022 | ............. | B82Y 10/00 |
| WO | WO 2019/225011 A1 | | 11/2019 | | |

OTHER PUBLICATIONS

Hanada et al., "Adaptive Type Modeling by Multi-Agent Reinforcement Learning," Proceedings of the 48th Annual Conference of the Institute of Systems, Control and Information Engineers (May 19, 2004).

Japanese Patent Application No. 2022-142512, Office Action (Dec. 12, 2023).

Ding et al., "Predicting optimal parameters with random forest for quantum key distribution," Quantum Information Processing, 19: 60 (2020).

Melnikov, "A physics approach to classical and quantum machine learning with applications in quantum experiment," Ph.D. Thesis for University of Innsbruck, Austria (2018).

Melnikov et al., "Setting up experimental Bell test with reinforcement learning," Phys. Rev. Lett., 125(16): 160401 (2020).

Sekatski et al., "Device-independent quantum key distribution from generalized CHSH inequalities," Quantum, 5: 444 (2020).

Tan et al., "Computing secure key rates for quantum cryptography with untrusted devices," Arxiv.org, Cornell University Library (2020).

Wang et al., "Machine Learning for Optimal Parameter Prediction in Quantum Key Distribution," Physical Review A, 100(6): 062334 (2018).

European Patent Office, Extended European Search Report in European Patent Application No. 21196667.6 (Feb. 25, 2022).

* cited by examiner

Figure 3:
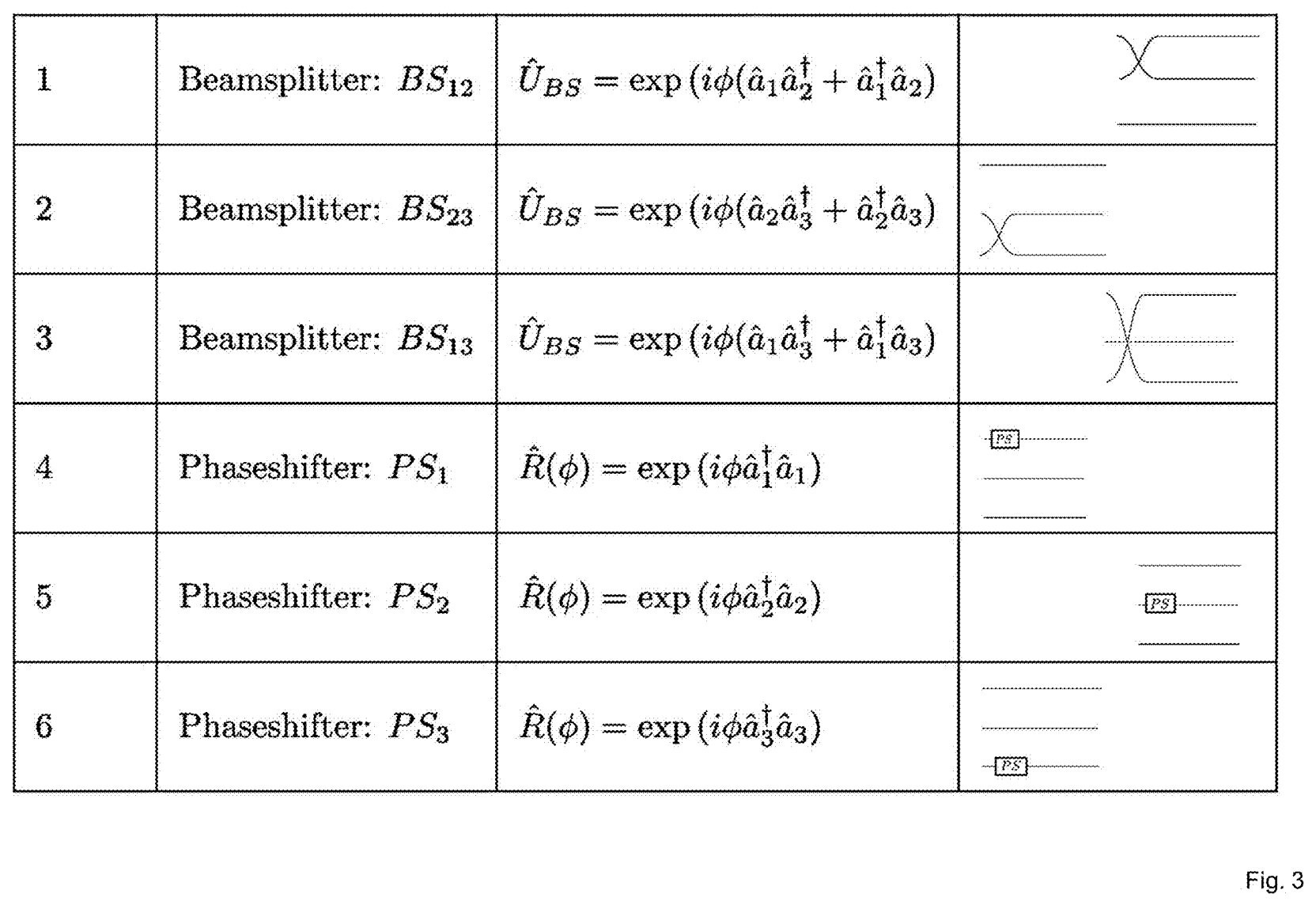

| 1 | Beamsplitter: $BS_{12}$ | $\hat{U}_{BS} = \exp\left(i\phi(\hat{a}_1\hat{a}_2^\dagger + \hat{a}_1^\dagger\hat{a}_2)\right)$ | |
| 2 | Beamsplitter: $BS_{23}$ | $\hat{U}_{BS} = \exp\left(i\phi(\hat{a}_2\hat{a}_3^\dagger + \hat{a}_2^\dagger\hat{a}_3)\right)$ | |
| 3 | Beamsplitter: $BS_{13}$ | $\hat{U}_{BS} = \exp\left(i\phi(\hat{a}_1\hat{a}_3^\dagger + \hat{a}_1^\dagger\hat{a}_3)\right)$ | |
| 4 | Phaseshifter: $PS_1$ | $\hat{R}(\phi) = \exp\left(i\phi\hat{a}_1^\dagger\hat{a}_1\right)$ | |
| 5 | Phaseshifter: $PS_2$ | $\hat{R}(\phi) = \exp\left(i\phi\hat{a}_2^\dagger\hat{a}_2\right)$ | |
| 6 | Phaseshifter: $PS_3$ | $\hat{R}(\phi) = \exp\left(i\phi\hat{a}_3^\dagger\hat{a}_3\right)$ | |

METHOD FOR DETERMINING A QUANTUM COMMUNICATION SETUP, QUANTUM COMMUNICATION SETUP, COMPUTER PROGRAM, AND DATA PROCESSING SYSTEM

CROSS REFERENCE TO RELATED APPLICATIONS

The instant patent application claims priority to European patent application no. EP21196667.6, filed on Sep. 14, 2021, which is incorporated herein in its entirety by reference.

FIELD OF THE DISCLOSURE

The present disclosure relates to a method for determining a quantum communication setup, the method being carried out in a data processing system. Further, a quantum communication setup, a computer program, and a data processing system are disclosed.

BACKGROUND

In quantum key distribution (QKD), legitimate parties, conventionally called Alice and Bob, want to establish a secret shared key that is completely unknown to a potential eavesdropper (conventionally called Eve). Finding an optimized component setup and post-processing design that provide a high key rate is generally a difficult task in QKD, because the number of possible experimental implementations grows exponentially with the number of components and, in an optical system, the number of optical modes. The higher the key rate, the more information can be securely exchanged between the legitimate parties.

A method for automated design of optical experiments was proposed in Melnikov et al., Phys. Rev. Lett., 125 (16), 2020, with the fundamental goal of finding a high Bell score in a scenario with a fixed number of measurements and outcomes.

SUMMARY

In one general aspect, the present disclosure describes a method for determining a quantum communication setup that allows for increased key rates in an efficient and resource-conserving manner.

In accordance with the disclosure, QKD protocols can be designed using a novel procedure including optimization with regard to the private key generation rate. The new method further allows for simultaneously devising the QKD protocol itself (encoding, post-selection rules etc.), optimizing its implementation, and upper-bounding the information leaking to an eavesdropper.

According to one aspect, a method for determining a quantum communication setup, the method being carried out in a data processing system, is provided. The method comprises: providing a component set indicative of a quantum communication setup comprising quantum communication components of at least one of a first communication device (Alice), a second communication device (Bob), and an eavesdropping device (Eve); selecting an action of a set of actions each indicative of a further quantum communication component, wherein each of the actions is selectable with a selection probability depending on the component set and a reward value; including the selected further quantum communication component in the component set; determining, from the component set, a quantum model comprising a quantum state of at least one of the first communication device, the second communication device, and the eavesdropping device; determining, from the component set and the quantum model, a maximum key rate by optimizing over an optimization parameter set comprising quantum communication component parameters; adjusting the reward value depending on the size of the maximum key rate in relation to a previous maximum key rate; and iteratively repeating above steps until a termination criterion is satisfied, yielding an optimal component set and an optimal setup parameter set.

According to a second aspect, a quantum communication setup comprising quantum communication components is provided, the quantum communication setup being prepared according to the optimal component set and the optimal setup parameter set generated by the method for determining a quantum communication setup.

According to another aspect, a computer program and/or a computer program product is provided comprising instructions which, when the computer program and/or the computer program product is carried out in a data processing system, cause the data processing system to perform the steps of the method for determining a quantum communication setup.

According to a further aspect, a data processing system is provided which is configured to determine a quantum communication setup by performing the following steps: providing a component set indicative of a quantum communication setup comprising quantum communication components of at least one of a first communication device, a second communication device, and an eavesdropping device; selecting an action of a set of actions each indicative of a further quantum communication component, wherein each of the actions is selectable with a selection probability depending on the component set and a reward value; including the selected further quantum communication component in the component set; determining, from the component set, a quantum model comprising a quantum state of at least one of the first communication device, the second communication device, and the eavesdropping device; determining, from the component set and the quantum model, a maximum key rate by optimizing over an optimization parameter set comprising quantum communication component parameters; adjusting the reward value depending on the size of the maximum key rate in relation to a previous maximum key rate; and iteratively repeating above steps until a termination criterion is satisfied, yielding an optimal component set and an optimal setup parameter set.

With the proposed method, which may include concepts from reinforcement learning, the complexity arising when increasing the number of components and the number of optical modes can be handled efficiently. This may allow for automating the design of quantum communication setups suitable for QKD and optimizing the corresponding setup parameters. The method may further allow for determining optimal post-selection procedures to increase the key rate, as well as for selecting the optimal parameters for a known level intensity captured by a potential eavesdropper. The obtained optimal component set may be physically implemented in a QKD setup.

The quantum communication components may comprise optical components, in particular at least one of beam splitters and phase shifters.

The quantum communication components may be components of the first and/or the second communication device, and/or the eavesdropping device.

Selecting the action may be carried out by a reinforcement learning agent, preferably the projective simulation agent.

The reinforcement learning agent may comprise a projective simulation network. The reinforcement learning agent may comprise a two-layered network. Alternatively, the reinforcement learning agent may comprise a deep feed-forward neural network.

A first layer of the network may comprise first nodes, each of which may represent a state which is indicative of one of the possible component sets. A second layer of the network may comprise second nodes, each of which may represent one action of the set of actions (each action indicative of a further quantum communication component, in particular, an optical component). The reinforcement learning agent may be part of a learning agent module.

Within the context of the present disclosure, an agent-environment interaction step between the reinforcement learning agent and an environment for exchanging quantities, such as an action/quantum communication component or a component set may be called a round. A sequence of rounds that leads to the reward value as a feedback signal may be called a trial.

The termination criterion may be fulfilled if a target key rate is reached by the determined maximum key rate. The termination criterion may also be fulfilled if a maximum number of trials is reached. The maximum number of trials may be an integer value between 50 and 1,000, preferably between 75 and 200, in particular 100. A maximum number of rounds per trial may be an integer value between 10 and 100, preferably between 15 and 25, in particular 20.

The (projective simulation) network may comprise a plurality of edges with weights, the weights preferably being trial-dependent and/or round-dependent.

The selection probability (policy) for selecting one of the set of actions may correspond to a reinforcement learning policy. Preferably, the selection probability for selecting one of the set of actions may depend on the exponential of the weight depending on the component set and the action.

Each of the selection probabilities may be updated after each round. Each of the weights may depend on a weight damping term and/or a glow term. A larger weight damping term may result in a smaller weight in the next round. A larger glow term may result in a larger weight in the next round.

The method may further comprise removing identical quantum communication components from the component set.

Preferably, identical quantum communication components may be removed from the component set after including the selected further quantum communication component in the component set and before determining the quantum model.

Removing the identical quantum communication components from the component set may be carried out in a compression module.

The quantum state may comprise a plurality of optical modes. Preferably, a random number comprising randomly generated informational bits may be encoded using optical modes.

The random number may be generated in the first communication device. The random number may be generated by a hardware random number generator, in particular, a quantum random number generator. The random number may be selected from an integer set with a discrete uniform distribution.

The random number may be encoded in phases of phase shifters of the quantum communication setup. Additionally or alternatively, the random number may be encoded into beam splitter parameters of the beam splitter or into component parameters of other optical elements of the quantum communication setup.

The quantum state may be dependent on the component set and/or the setup parameter set. The quantum state may be at least one of a first quantum state $|\Psi_a\rangle$ associated with the first communication device, a signal state $$\varrho_{AS}^{Alice\rightarrow}$$

associated with transmitting the first quantum state $|\Psi_a\rangle$ via a quantum channel, a second quantum state $$\varrho_{ABE}^{Eve\rightarrow}$$

in a joint system comprising the first and the second communication device as well as the eavesdropping device, and a third quantum state $$\varrho_{ABE}^{Bob\rightarrow},$$

further including displacement carried out in the second communication device.

The optical modes may comprise time bin modes and/or frequency modes. Determining the quantum model may be carried out in a physics simulation module.

The quantum model may further comprise a plurality of quantum measurements carried out in the first and/or second communication device.

The quantum model may comprise quantum operators, preferably acting on quantum states. The quantum operators may be POVM (positive operator-valued measure) elements. The POVM elements may each consist of partial operators acting on one optical mode state.

The method may further comprise: determining, from the quantum model, a postselection set comprising measurement outcomes accepted by the first communication device and the second communication device. The postselection set may preferably be determined by determining, for each measurement outcome, first information about a corresponding informational bit provided to the second communication device and leaked information about the corresponding informational bit provided to the eavesdropping device.

The first information and the leaked information may be determined by establishing a first conditional entropy and a second conditional entropy, respectively. The maximum key rate may depend on the postselection set.

The postselection set may be determined by including measurement outcomes for which leaked information is less than the first information and the discard measurement outcomes for which leaked information is greater than the first information.

The postselection set may be determined via an optimization routine, in particular via simulated annealing or tree search.

Included measurement outcomes may be indicated by a unit postselection mask bit of a postselection mask string. Discarded measurement outcomes may be indicated by a zero postselection mask bit of the postselection mask string.

The maximum key rate may be determined via a global optimization method, in particular via simulated annealing.

During optimization, optimization parameters of the optimization parameter set may be sampled from a finite interval with a (continuous) uniform distribution. The length of the interval may depend on the type of optimization parameter. The optimization may be carried out in an optimization module.

The optimization parameter set may comprise at least one of an intensity value, a phase shift value, and a postselection mask bit. Additionally or alternatively, the optimal setup parameter set may comprise at least one of an optimal intensity value and an optimal phase shift value.

The optimization parameter set and/or the optimal setup parameter set may comprise further (quantum communication) setup parameters/quantum communication component parameters, in particular optical component parameters, namely beam splitter parameters and/or phase shifter parameters and/or displacement amplitudes.

The method may further comprise: before adjusting the reward value, if the maximum key rate is less than or equal to the previous key rate, iteratively including another element in the component set, updating the quantum key distribution model, the postselection set, and the maximum key rate until a maximum number of iterations is reached or the maximum key rate is greater than the previous key rate.

The maximum number of iterations may a maximum number of iterations per round/agent-environment interaction step.

If the maximum number of iterations is reached, the reward value may be set to zero, and/or the component set may be reset to an empty set.

If the maximum key rate is greater than the previous key rate, the reward value may be set to a nonzero value, preferably to one, and the component set may be preserved.

The method may further comprise, outside the data processing system, preparing the quantum communication setup according to the optimal component set and the optimal setup parameter set.

Preparing the quantum communication setup may comprise arranging and adjusting phase shifters and/or beam splitters according to the optimal component set and the optimal setup parameter set.

The aforementioned embodiments related to the method for determining a quantum communication setup can be provided correspondingly for the data processing system configured to determine a quantum communication setup.

DESCRIPTION OF THE SEVERAL VIEWS OF THE DRAWINGS

In the following, embodiments, by way of example, are described with reference to figures, in which:

FIG. 3 shows a table comprising an exemplary set of actions and corresponding quantum communication components;

DETAILED DESCRIPTION

Figure 1:
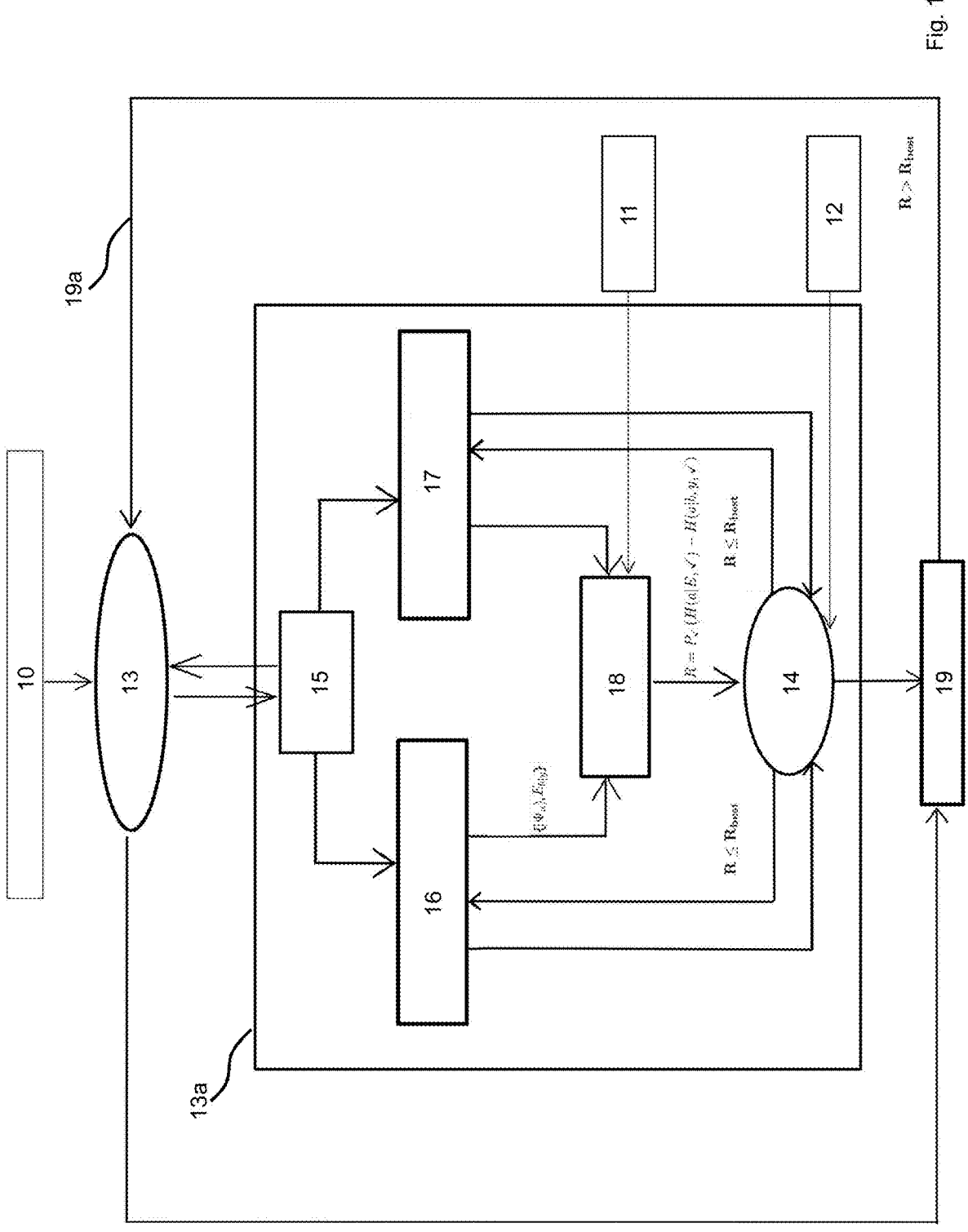
FIG. 1 shows a graphical representation of an embodiment of the proposed method.

FIG. 1 shows a graphical representation of an exemplary embodiment of the proposed method, in which establishing an optical setup and post-selection scheme leading to a high raw key generation rate for quantum key distribution (QKD) in an automated way is treated as a reinforcement learning task.

The input quantities 10, 11, 12 of the method comprise available operations and a physical model thereof, meta-parameters 10 of a (reinforcement) learning agent module 13, properties 11 of a quantum communication channel (as a physical model), and hyper-parameters 12 of an optimization module 14. As output 19 of the method, an optimal component set indicative of an optimal quantum communication setup and an optimal setup parameter set may be provided.

Figure 4:
FIG. 4 shows a graphical representation of an embodiment of a quantum communication setup.

The exemplary method aims at automating the design of QKD setups and their implementation for achieving high raw key rates between a first communication device 40 (conventionally called Alice) and a second communication device 43 (conventionally called Bob), cf. FIG. 4. The method makes use of a model of the quantum channel between the first and the second communication devices 40, 43 and a set of possible operations that can be performed on the physical system associated with the first and the second communication device.

In particular, in a measure-and-prepare QKD protocol, a quantum system, in which a randomly generated value a is encoded, is prepared in the first communication device 40 and sent to the second communication device 43 over the quantum channel. Subsequently, quantum measurements with measurement settings y are carried out in the second communication device 43, yielding measurement outcomes b. In a post-processing step, certain outcomes b are accepted by the second communication device 43 (post-selection), and certain events (subsets of possible combinations (a, y)) are accepted by both the first and the second communication device 40, 43 (sifting) after partial information on a and y has been publicly revealed.

The automated design task may be cast as interaction of the reinforcement learning agent module 13 with an environment 13*a* comprising environment modules 14 to 18. As input, the learning agent module 13 takes a maximum number of actions and a maximum length of the experiment. At each interaction step, the learning agent module 13 determines which action to choose, depending on the current state of the environment 13*a*. Then, the state of the environment 13*a* is updated and the learning agent module 13 receives a feedback reward value 19*a* and an updated state of the environment 13*a*. After the learning agent module 13 has determined an action, a component set is updated and subsequently compressed (in a compression module 15), i.e., cleared from redundant components. In a physics simulation module 16, using the established (compressed) component set, the encoding procedure in the first communication device and measurement procedure in the second communication device are simulated. In a post-processing module 17, a post-selection procedure is performed. Employing the respective outcomes from the physics simulation module 16 and the post-processing module 17, a corresponding (raw) key rate is calculated in a security proof module 18. A final private key with corresponding final key rate can be obtained from a shared raw key with standard error-correction and privacy amplification techniques. The key rate is used to compute the reward value that is fed back as feedback signal 19a to the reinforcement learning agent module 13, thus enabling reinforcement learning.

In the description that follows, each step of the method is described in general terms, before the steps are detailed by way of example in the subsequent section. For clarity, the steps are disclosed together with modules 13 to 19. As a skilled person understands, the described method steps can also be carried out without such a modularization.

The learning agent module 13 takes a number N of different optical elements, a maximum component set length $L_{max}$, the current component set $s_k(t)$ (after compression), the reward value r(t), and meta-parameters as input and outputs an index of an action/further quantum component $a_k(t)$. The reinforcement learning agent module 13 interacts with the environment 13a in rounds (agent-environment interaction steps) k. A sequence of rounds k that leads to the reward value r(t) as a feedback signal 19a is called a trial t. One round and one optimization step are visualized in FIG. 1. At the beginning of each trial t, the learning agent module 13 receives a component set $s_0(t)$ as an input state, which is a representation of an initial (empty) optical component setup. Subsequently, the learning agent module 13 selects an action $a_1(t)$ out of a set of available actions, corresponding to adding a further quantum communication component to the component set $s_k(t)$. The available set of actions may comprise applying optical elements and can vary depending on the particular experimental implementation. The selection process is conditioned by a present policy $\pi_k$ of the learning agent module 13, while in turn the policy $\pi_k$ is modified at the end of the round depending on the fed back reward value received by the learning agent module 13.

A compression module 15 receives an (index of an) action $a_k(t)$ corresponding to a further quantum communication component and a component set of the previous round $s_{k-1}(t)$ as input, and outputs the current component set after compression $s_k(t)$. The quantum communication component $a_k(t)$ selected by the reinforcement learning agent module 13 is included in the component set $s_{k-1}(t)$, yielding a new component set $$s'_k(t).$$

The new component set $$s'_k(t)$$

is fed to the compression module 15 and undergoes compression, wherein identical components are removed from the component set, resulting in the component set (after compression) $s_k(t)$.

The physics simulation module 16 takes the current component set after compression $s_k(t)$, a list of parameter values for each quantum communication component, each state preparation a, and measurement setting y as input and outputs a quantum model $\{|\Psi_a\rangle, E_{b\backslash y}\}$ from the component set $s_k(t)$. The quantum model $\{|\Psi_a\rangle, E_{b\backslash y}\}$ comprises a first quantum state $|\Psi_a\rangle$ of the first communication device and quantum measurements/POVMs $\{E_{b\backslash y}\}$ carried out in the second communication device 43. In the first communication device 40, a random number a is generated and encoded into the first quantum state $|\Psi_a\rangle$, which is subsequently sent to the second communication device via a quantum channel using the quantum communication setup corresponding to the component set provided by the learning agent module 13. The received quantum state is measured in the second communication device via a measurement setup yielding a measurement outcome b. The measurement settings y can also depend on y being a random number generated locally, which, e.g., may parametrize the employed measurement basis. In the physics simulation module, the optical setup is simulated, which yields the first quantum state $|\Psi_a\rangle$ corresponding to the random number a encoded by the first communication device 40 and further yields measurements $\{E_{b\backslash y}\}$ carried out in the second communication device 43.

The post-processing module 17 takes the component set $s_k(t)$, the number of possible state preparations a, the measurement settings y and the measurement outcomes b as input and outputs a post-processing strategy. In QKD, post-processing comprises post-selection procedures that provide legitimate parties (the first and the second communication device 40, 43) the possibility to share more information than a potential eavesdropping device 44 (conventionally called Eve) can intercept. The first and the second communication device 40, 43 can publicly reveal information on their random inputs a and y and decide to discard a communication round if the revealed information does not match a pattern (basis reconciliation/sifting). Moreover, the second communication device 43 may skip a round and announce publicly if the measurement outcome b does not meet a predefined requirement (post-selection). The post-processing module 17 provides the optimal post-processing strategy for the input data, i.e., a binary string corresponding to a postselection mask, where, e.g., value "1" (unit value) corresponds to a retained measurement outcome and value "0" to a discarded measurement outcome.

The security proof module 18 uses the quantum model $\{|\Psi_a\rangle, E_{b\backslash y}\}$ and the post-processing strategy as input, and outputs a key rate R, in particular a current key rate $$R_k^{(i)}(t)$$

corresponding to iteration i, round k and trial t.

In order to prove security of the QKD protocol resulting from the employed quantum communication setup and compute the current key rate $$R_k^{(i)}(t),$$

lower bounds on the entropy $H(a\backslash E, \checkmark)$ of the eavesdropping device 44 for all attacks that are compatible with the measurement statistics observed by the first and the second communication device as well intrinsic characteristics of the transmission line can be established independently. Thus, the key rate R of a particular implementation for one-way error correction is $$R = P_{\checkmark}(H(a\backslash E, \checkmark) - H(a\backslash b, y, \checkmark)), \tag{1}$$

where the symbol "$\checkmark$" denotes all events that are accepted by the first and second communication device 40, 43 after post-processing. The security proof module 18 computes a bound on information accessible to the eavesdropping device 44, and outputs the current key rate $$R_k^{(i)}(t)$$

at which transmission of information from the first communication device 40 to the second communication device 43 can be carried out securely.

There are several possibilities to implement the security proof module 18. The security of a given protocol can be determined using a precise model of the quantum channel, which may be available via external communication channel control techniques. Alternatively, the entropy $H(a\backslash/E, \checkmark)$ of the eavesdropping device 44 can be bounded numerically, e.g., via an explicit constrained minimization over a plurality of quantum channels or via genetic algorithms to explicitly design attacks from the eavesdropping device 44.

The optimization module 14 takes the component set $s_k(t)$, the post-processing strategy, the hyper-parameters, a maximum number of optimization iterations, a previous maximum key rate $R(t-1)$, and the current key rate $$R_k^{(i)}(t)$$

as input, and outputs a number of possible quantum state preparations and measurements, parameters of the quantum communication components in the component set $s_k(t)$ for all encodings and measurements, a post-processing scheme, and the reward value $r(t)$. The optimization module 14 allows for optimizing parameters of the provided quantum communication setup and post-processing strategy such that the key rate is maximized. An employed optimization algorithm enables the reinforcement learning agent module 13 to determine quantum communication setups and post-processing strategies for QKD protocols that provide higher key rates. Via optimization, optimal parameters for all the quantum communication components in the quantum communication setup determined by the learning agent module 13 are established such that measurement results lead to the highest possible key rate. Further, optimal parameters for the post-processing strategy can be established. Optimization proceeds until a maximum number of optimization iterations is reached, or until a round key rate $R_k(t)$ at round k (over all current key rates $$R_k^{(i)}(t)$$

of the iterations i of round k) is greater than the previous maximum key rate $R(t-1)=\max_{k',t'}R_{k'}(t'\backslash/t'\leq t-1)$ from the previous trials. If $R_k(t)>R(t-1)$, the reward value is set to $r(t)=1$, the trial t ends, and the learning agent module 13 starts the next trial t+1 from the initial configuration s(t+1) with an empty component set and an updated key rate $R(t)$.

DETAILED DESCRIPTION OF THE METHOD STEPS BY WAY OF EXAMPLE

In the following, the method for determining a quantum communication setup will be further described by application to a particular quantum communication setting.

Figure 2:
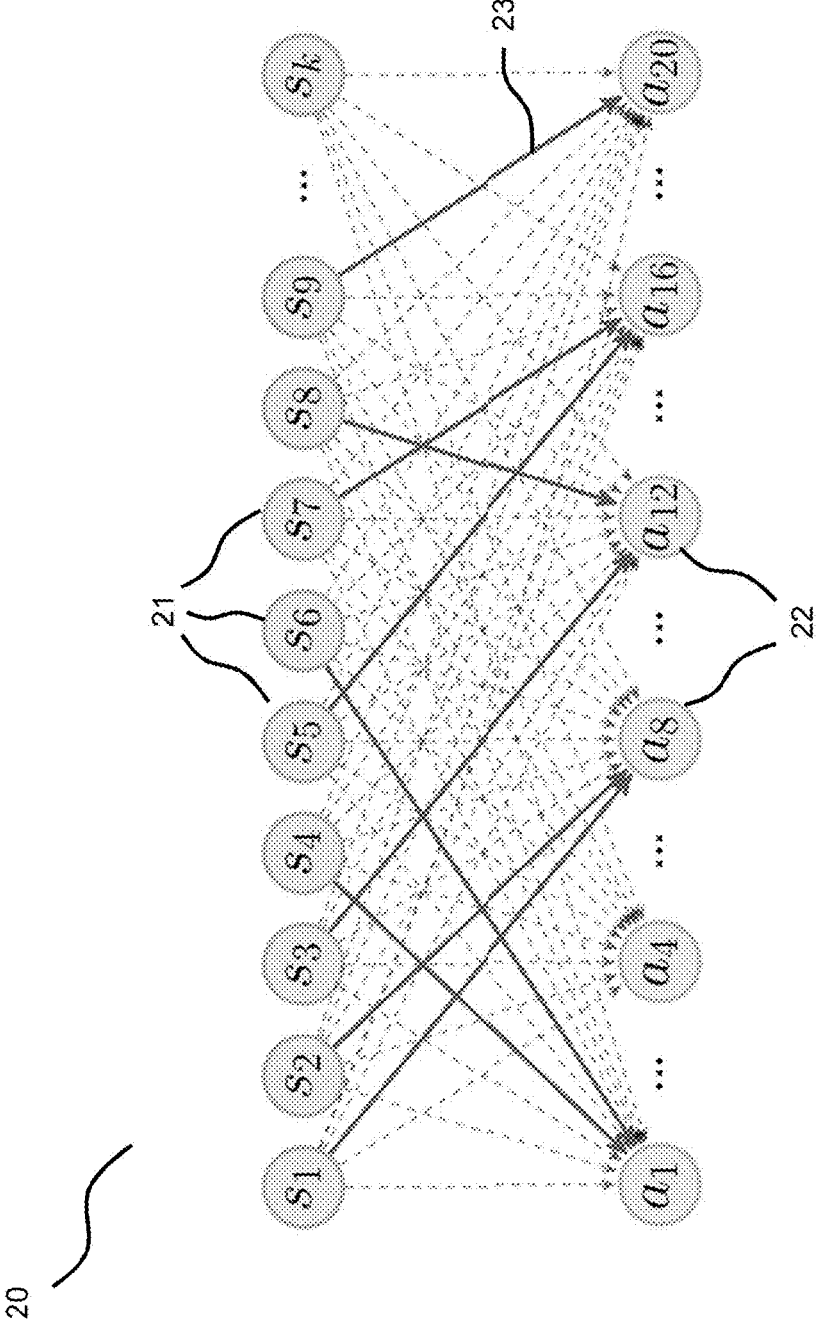
FIG. 2 shows a graphical representation of an embodiment of the projective simulation agent.

FIG. 2 shows a graphical representation of the projective simulation agent, which is employed as a reinforcement learning agent in the learning agent module 13. The projective simulation agent comprises a two-layered projective simulation network 20. The simulation network 20 comprises a first layer of first nodes (percepts) 21 that represent the states/component sets s(k, t) and a second layer of second nodes 22 that represent the actions a(k, t). The first nodes 21 and the second nodes 22 are connected by directed edges 23 with trial-dependent and round-dependent weights $h_k(s, a, t)$. The weights $h_k(s, a, t)$ together fully define a policy function $\pi_k$. The mapping from the weights $h_k(s, a, t)$ to a policy $\pi_k(s, a, t)$ of the policy function $\pi_k$ can be embodied in various ways within the projective simulation model, e.g., $$h_k(s, a, t) \mapsto \pi_k(s, a, t) = \frac{e^{h_k(s,a,t)}}{\sum_{a'} e^{h_k(s,a',t)}}. \qquad (2)$$

The policy $\pi_k(s, a, t)$ is updated after each round/agent-environment interaction step k by performing a change of weights $h_k(s, a, t)$, namely, $$h_{k+1}(s,a,t)=h_k(s,a,t)-\gamma_{PS}(h_k(s,a,t)-1)+g_{k+1}(s,a,t)r(t), \qquad (3)$$

where initial weights $h_1(s, a, 1)$ are set to $h_1(s, a, 1)=1$ for all (s, a) pairs. The reward value r(t) is binary-valued, i.e., $r(t)=1$ in case the reinforcement learning agent found a component set yielding a higher current key rate $$R_k^{(i)}(t)$$

during trial t and $r(t)=0$ otherwise. Glow values $g_k(s, a, t)$, multiplied with the reward value r(t), are also used for updating the weights $h_k(s, a, t)$. The glow value $g_{k+1}(s, a, t)$ is set to $g_{k+1}(s, a, t)=1$ in case the state s and action a appeared in round k. For all other state-action pairs), the glow values $g_{k+1}(s, a, t)$ are set to $g_{k+1}(s, a, t)=(1-\eta_{PS})g_k(s, a, t)$, wherein $\eta_{PS}$ denotes a first meta-parameter of the projective simulation model that is fixed. Initially, all glow values $g_k(s, a, t)$ are equal to zero, as there is no history of state-action pairs.

The second term on the right-hand side of Eq. (3), $\gamma_{PS}(h_k(s, a, t)-1)$, is a weight damping term corresponding to "forgetting" of the reinforcement learning agent. Small levels of a second meta-parameter $\gamma_{PS}$ allow the reinforcement learning agent to switch to completely new strategies in designing quantum communication setups within one learning run, which consists of the whole sequence of trials. The second meta-parameter $\gamma_{PS}$ is also considered to be fixed. The first and the second meta-parameter can, e.g., be $\eta_{PS}=0.3$ and $\gamma_{PS}=10^{-3}$, respectively. Further meta-parameters such as a maximum number of trials $N_{tr}$, and a maximum number of rounds per trial $N_r$ can, e.g., be set to 100 and 20, respectively. Furthermore, a number of actions $n_{act}$ can be set to 6 and a maximum length of the component set $L_{max}$ can be set to 8. The reinforcement learning agent determines which action $a_k(t)$ to select depending on the policy function $\pi_k$. The policy $\pi_k(s, a, t)$ represents the probability of action a to be selected at round k and trial t, given the state $s_k(t)$.

After one action a of the set of actions has been selected with a probability corresponding to the associated policy $\pi_k(s, a, t)$, the corresponding quantum communication component is included in the component set.

FIG. 3 shows a table comprising an exemplary set of actions a (labelled with integer values in col. 1) and corresponding quantum communication components (col. 2).

Here, the quantum communication components are optical components, namely beam splitters (BS) and phase shifters (PS). Each of the beam splitters acts on two of three optical modes, each phase shifter acts on one of the three optical modes (cf. graphical representations in col. 4). The corresponding unitary operations in terms of creation and annihilation operators $$\hat{a}_m^\dagger, \hat{a}_n$$

are shown in col. 3. If, for example, action 1 (first row of the table) is selected, beam splitter $BS_{12}$ is included in the component set.

Subsequently, the compression module 15 simplifies/compresses the component set by removing identical components from the component set $s_k$. The compressed component set is then passed on to the physics simulation module 16 and the post-processing module 17, both of which connect the component set $s_k$ to the quantum communication setup to be optimized.

FIG. 4 shows a graphical representation of a general quantum communication setup for quantum key distribution. In the first communication device 40 ("Alice"), a random number a is generated by a quantum random number generator QRNG 41 from a set $\{1, \ldots, K\}$ with integer K. The random number a is encoded into the first quantum state $|\Psi_a\rangle$ of d optical modes, which is prepared in a preparation unit 42.

The encoding is carried out by first preparing an initial state $|\Psi_0\rangle$, a fixed coherent state of the optical modes, e.g., $$|\Psi_0\rangle = |\alpha^{(1)}\rangle \otimes |\alpha^{(2)}\rangle \otimes \ldots \otimes |\alpha^{(d)}\rangle, \tag{4}$$

and, second, applying a unitary transformation $\hat{U}_a$ on the optical modes, resulting in the first quantum state $$|\Psi_a\rangle = \hat{U}_a|\Psi_0\rangle. \tag{5}$$

The first quantum state $|\Psi_a\rangle$ is subsequently sent as a signal state $$\varrho_{AS}^{Alice\rightarrow}$$

to the second communication device 43 ("Bob"), over a quantum channel, which may be public. Information (from the random number a) is encoded into the unitary transformation $\hat{U}_a$, while the initial state $|\Psi_0\rangle$ is fixed. The unitary transformation $\hat{U}_a$ is defined by the current component set $s_k(t)$.

The signal state $$\varrho\varrho_{AS}^{Alice\rightarrow}$$

in a joint AS quantum system is given by $$\varrho_{AS}^{Alice\rightarrow} = \sum_{a=1}^{K} p(a)|a\rangle\langle a|_A \otimes |\Psi_a\rangle\langle\Psi_a|_S, \tag{6}$$

where system A represents the classical number a to be transmitted from the first communication device 40 to the second communication device 43, and system S represents the corresponding signal. The random number a is randomly selected with probability p(a).

The first communication device 40 may be identified with the reinforcement learning agent in that the most appropriate set of unitary transformations and initial state $$\left\{\{\hat{U}_a\}_{a=1}^K, |\Psi_0\rangle\right\}$$

may be selected for modifying the first communication device 40, so that the key rate R is maximized depending on a fraction $r_E$ of intensity of the transmitted signal that can be intercepted by the eavesdropping device 44 ("Eve"). Each unitary transformation $\hat{U}_a$ corresponds to a component set (of optical elements), the sequence of which the reinforcement learning agent can arbitrarily change.

There are several physical degrees of freedom with which the d different optical modes can be implemented. One option is time-binning. The advantage of such an encoding is that different optical modes do not suffer from relative dephasing during transmission through an optical fiber of the quantum channel. A disadvantage may be, in some circumstances, that the possible encodings corresponding to the unitary transformation $\hat{U}_a$ as well as measurements by the second communication device 43 are limited.

Another option for implementing the optical modes is employing different frequencies. The optical modes can be slightly different from each other with regard to their respective frequency. As a result, the optical modes can be combined to a signal in a single optical fiber by employing a wave multiplexer. It is thus possible to perform a nontrivial unitary transformation $\hat{U}_a$ on optical modes that have been created in such a way. Relative dephasing, however, may be a challenge in some circumstances, since the employed frequencies are generally only slightly different from each other.

Assuming that the eavesdropping device 44 is limited to beam splitter attacks, after the attack of the eavesdropping device 44 a second quantum state $$\varrho_{ABE}^{Eve\rightarrow}$$

of a joint ABE quantum system comprising the random number (A), the signal to the second communication device (B) and the signal intercepted by the eavesdropping device 44 (E) is described by $$\varrho_{ABE}^{Eve\rightarrow} = \tag{7}$$
$$\sum_{a=1}^{K} p(a)|a\rangle\langle a|_A \otimes \left|\sqrt{T(1-r_E)}\,\Psi_a\right\rangle\left\langle\sqrt{T(1-r_E)}\,\Psi_a\right|_B \otimes \left|\sqrt{r_E}\,\Psi_a\right\rangle\left\langle\sqrt{r_E}\,\Psi_a\right|_E,$$

with transmission $T=10^{-\lambda D/10}$ and $\lambda$ denoting losses in dB per km on the quantum channel having length D.

To the remaining signal received in the second communication device 43, displacement operations $\hat{D}$ are applied, yielding a third quantum state $$\varrho_{ABE}^{\rightarrow Bob} = \sum_{a=1}^{K} p(a)|a\rangle\langle a|_A \otimes |\Psi_a'\rangle\langle\Psi_a'|_B \otimes \left|\sqrt{r_E}\,\Psi_a\right\rangle\left\langle\sqrt{r_E}\,\Psi_a\right|_E, \tag{8}$$

with quantum states after displacement $$|\Psi'_a\rangle.$$

The displacement operator for one mode is the shift operator $$\hat{D}(\alpha)=\exp(\alpha\hat{a}^\dagger-\alpha^*\hat{a}) \tag{8a}$$

where $\alpha$ is the amplitude of displacement. With the shift operator, a localized state may be displaced in phase space by the magnitude $\alpha$.

On the third quantum state $$\hat{\varrho}^{\rightarrow Bob}_{ABE},$$

measurements are performed in the measurement unit 45 with detectors, which may be represented by POVM (positive operator-valued measure) elements $$\hat{E}_b=\hat{P}_{i_1}\otimes\hat{P}_{i_2}\otimes\ldots P_{i_d}, \; i_1,\ldots,i_d=\text{click,no click}, \tag{9}$$

where $\hat{P}_{click}=\hat{I}-|0\rangle\langle 0|$ and $\hat{P}_{noclick}=|0\rangle\langle 0|$.

Generally, several types of measurements are possible, which are depending on the parameter y chosen by the second communication device (43). It may be provided that click/no click measurements are carried out and y is fixed. In this case, $E_{b\backslash\backslash y}$ corresponds to $E_b$. In a more general case, an ensemble of different measurements associated with some probability distribution could be employed to choose different y.

The first and the second communication device 40, 43, corresponding to the legitimate parties, subsequently perform postselection via a classical authenticated channel by discarding all non-conclusive measurement outcomes in the second communication device 43, which provides the legitimate parties with an additional informational advantage over the eavesdropping device 44. The legitimate parties may thus decide whether to accept (✓) a particular outcome b or not (x). This procedure enables them to select only those measurement outcomes b that mostly contribute to the key rate R.

Figure 5:
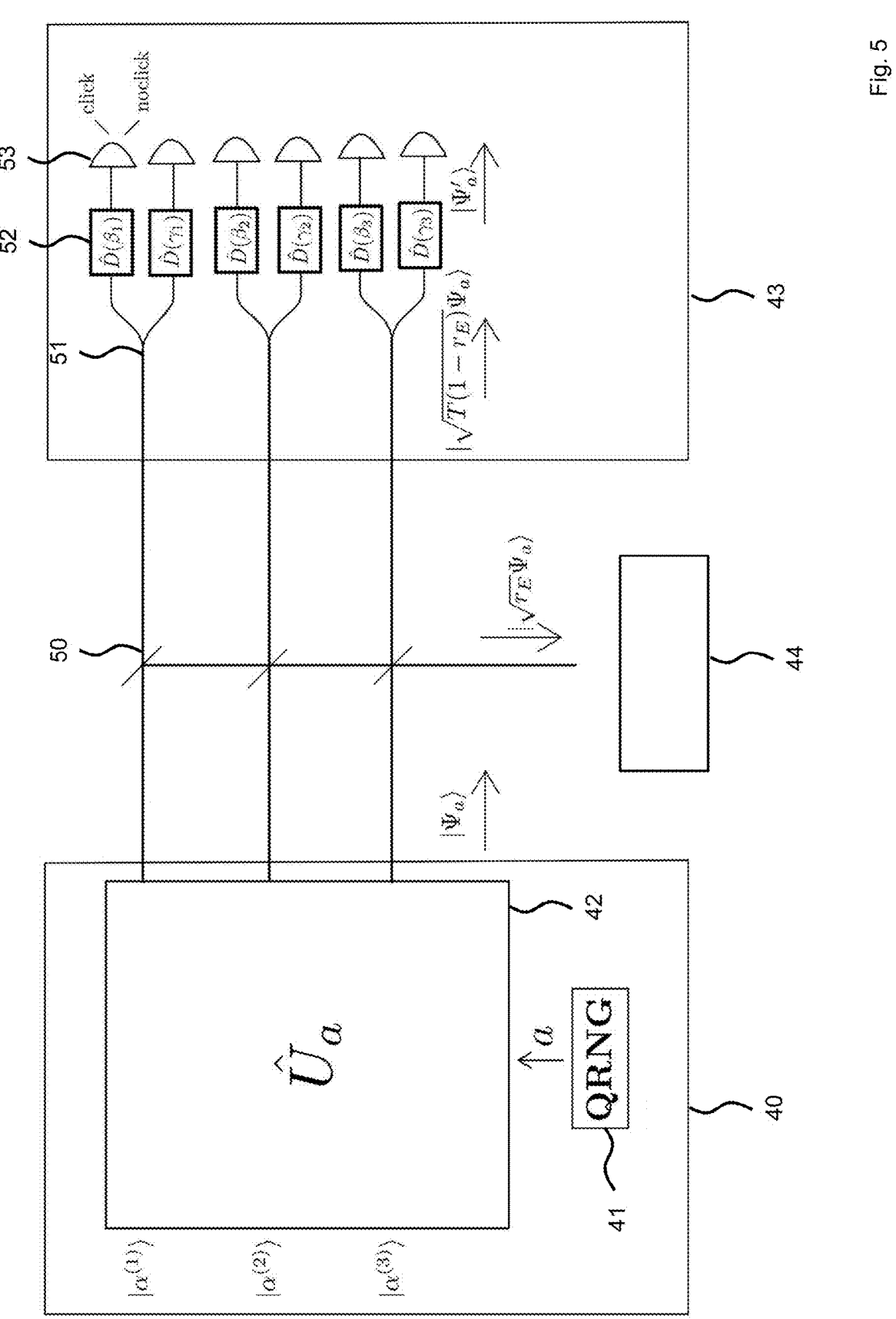
FIG. 5 shows a graphical representation of an implementation of an embodiment of the quantum communication setup with three optical modes.

FIG. 5 shows a graphical representation of an implementation of the quantum communication setup with three optical modes $|\alpha^{(1)}\rangle$, $|\alpha^{(2)}\rangle$, $|\alpha^{(3)}\rangle$. In the first communication device 40, the random number a is encoded into the unitary transformation $\hat{U}_a$, which is applied on the coherent initial state $|\Psi_0\rangle$. The intensity of the coherent initial state $|\Psi_0\rangle$ is determined by optimization in the optimization module 14. The unitary transformation $\hat{U}_a$ corresponds to a quantum communication setup, namely an optical setup such as an optical table, the optical elements of which are selected by the reinforcement learning agent. The component parameters of the optical elements selected by the reinforcement learning agent are also optimized in the optimization module 14. The random number a comprising informational bits is encoded only in the phases of the phase shifters of the optical setup. Additionally or alternatively, the random number a/the information bits can be encoded into beam splitter parameters of the beam splitter or into component parameters of other optical elements. The maximum amount of information that can be encoded for $a\in\{1,\ldots,K\}$ is $\log_2 K=3$ bits. The transmitted signal states may be partially diverted to the eavesdropping device 44 by eavesdropping beam splitters 50. In the second communication device 43, the signal states are divided for each optical mode into two sub modes via further beam splitters 51, after which displacement operations $\hat{D}$ 52 are applied to each of the six sub modes, and measurements by non-photon-number-resolving detectors 53 are carried out.

The displacements for the respective displacement operations $\hat{D}$ 52 are represented by $$\beta_1 = -\sqrt{T(1-r_E)}\,\Psi_1^{(1)}/\sqrt{2},\; \gamma_1 = -i\sqrt{T(1-r_E)}\,\Psi_2^{(1)}/\sqrt{2}, \tag{10}$$
$$\beta_2 = -\sqrt{T(1-r_E)}\,\Psi_3^{(2)}/\sqrt{2},\; \gamma_2 = -i\sqrt{T(1-r_E)}\,\Psi_4^{(2)}/\sqrt{2},$$
$$\beta_3 = -\sqrt{T(1-r_E)}\,\Psi_5^{(3)}/\sqrt{2},\; \gamma_3 = -i\sqrt{T(1-r_E)}\,\Psi_6^{(3)}/\sqrt{2}.$$

Post-processing may comprise only postselection, i.e., selecting a subset of all measurement outcomes $b\in B_{\checkmark}\subset B$ that are accepted by the second communication device 43. To decide if a measurement outcome b is retained, first information that the measurement outcome b provides to the second communication device 43 about the corresponding informational bit from the random number a generated in the first communication device 40 is compared with leaked information about the corresponding informational bit provided to the eavesdropping device 44. The first information can be expressed using first conditional entropy $$H(A\backslash/b) \tag{11}$$

and the leaked information *can be* expressed using second conditional entropy $$H(A\backslash/E,\checkmark) \tag{12}$$

If the condition $H(A\backslash/E,\checkmark)>H(A\backslash/b)$ is satisfied, the outcome b reveals more information about the random number a to the second communication device 43 than to the eavesdropping device 44, and the measurement outcome b is retained for further processing. Notably, the second conditional entropy $H(A\backslash/E,\checkmark)$ also depends on the postselection procedure, which results in a self-referential problem.

In order to determine a suitable postselection procedure, the second conditional entropy $H(A\backslash/E,\checkmark)$ has to be bounded, e.g., via the Holevo bound. After measuring the third quantum state $$\hat{\varrho}^{\rightarrow Bob}_{ABE}$$

(cf. Eq. (8)) and obtaining the measurement outcome b in $B_{\checkmark}$, a resulting unnormalized quantum state is given by $$\sum_{a=1}^{K}\sum_{b\in B_{\checkmark}} p(a)p(b\,|\,a)|a\rangle\langle a|_A\otimes|b\rangle\langle b|_B\otimes\left|\sqrt{r_E}\,\Psi_a\right\rangle\left\langle\sqrt{r_E}\,\Psi_a\right|_E, \tag{13}$$

with $$p(b|a) = \left\langle\Psi'_a\left|\hat{E}_b\right|\Psi'_a\right\rangle.$$

Requiring that the random number a is randomly selected with equal probabilities, p(a) can be expressed as $p(a)=1/K$. Normalizing the unnormalized quantum state results in a fourth quantum state $\hat{\varrho}_{ABE\,\backslash/\checkmark}$ with $$\rho_{ABEv\checkmark} \tag{14}$$

$$= \sum_{a=1}^{K} \sum_{b \in B_{\checkmark}} \frac{p(a)p(b\,|\,a)}{P_{\checkmark}} |a\rangle\langle a|_A \otimes |b\rangle\langle b|_B \otimes |\sqrt{r_E}\,\Psi_a\rangle\langle\sqrt{r_E}\,\Psi_a|_E$$

and postselection probability $$P_{\checkmark} = \sum_{a=1}^{K} \sum_{b \in B_{\checkmark}} p(a)p(b \vee a).$$

The second conditional entropy $H(A\backslash E, \checkmark)$ can be bounded as $$H(A\backslash E,\checkmark) H_{\rho_{ABEv\,\checkmark}(A\backslash E)} = H_{\rho_{ABEv\,\checkmark}(A)} -$$

$$I_{\rho_{ABEv\,\checkmark}(E:A)} \tag{15}$$

using the Holevo bound $I_{\rho_{ABEv\,\checkmark}}(E:A) \leq H_{\rho_{ABEv\,\checkmark}}(E)$. The probability of postselection for a given input $a$ can be computed as $$p(a \vee \checkmark) = \frac{p(a)p(\checkmark \vee a)}{P_{\checkmark}} = \frac{p(a)\sum_{b \in B_{\checkmark}} p(b \vee a)}{P_{\checkmark}}. \tag{16}$$

Inserting into Eq. (14) yields $$\rho_{AEv\checkmark} = \sum_{a=1}^{K} p(\checkmark \vee a)|a\rangle\langle a|_A \otimes |\sqrt{r_E}\,\Psi_a\rangle\langle\sqrt{r_E}\,\Psi_a|_E \tag{17}$$

and Eq. (15) can be written as $$H(A\backslash E,\checkmark) \geq H(p(a\backslash\checkmark)) - H(C), \tag{18}$$

using that the entropy of the state of the eavesdropping device, $$\rho_{Ev\checkmark} = \sum_{a=1}^{K} p(\checkmark \vee a)|\sqrt{r_E}\,\Psi_a\rangle\langle\sqrt{r_E}\,\Psi_a|_E, \tag{19}$$

is equal to the entropy of the Gram matrix $$C_{ij} = \sqrt{p(i\backslash\checkmark)p(j\backslash\checkmark)}\langle\sqrt{r_E}\Psi_i\backslash\sqrt{r_E}\Psi_j\rangle. \tag{20}$$

The first conditional entropy $H(A\backslash b)$ for the measurement outcome $b$ is given by $H(A\backslash b) = H(p(a\backslash b))$, where $$p(a \vee b) = \frac{p(a)p(b \vee a)}{p(b)} = \frac{\frac{1}{K}p(b \vee a)}{\sum_{a=1}^{K}\frac{1}{K}p(b \vee a)} = \frac{p(b \vee a)}{\sum_{a=1}^{K}p(b \vee a)}. \tag{21}$$

The second conditional entropy $H(A\backslash b)$ is fully determined by the measurement outcome $b$ and does not depend on postselection.

The key rate R then reads $$R = \sum_{b \in B_{\checkmark}} p(b)(H(A \vee E, \checkmark) - H(A \vee b)). \tag{22}$$

The key rate R depends on the postselection set. The most suitable and thus employed postselection set may be $B_{\checkmark}$. The postselection module 17 yields a binary string (post-selection mask) with length $x=2^{2^d}=64$, where unit values correspond to accepted measurement outcomes that will be retained.

This postselection mask, and thus the postselection set is determined by optimization. Subsequently, classical error-correction and privacy amplification protocols may be performed on the accepted positions of the postselection set, which can in principle be done at the Shannon limit.

Having established the component set $s_k(t)$, the corresponding physical model $\{|\Psi_a\rangle, E_{b\backslash y}\}$ and the postselection set $B_{\checkmark}$, the maximum key rate $R_k(t)$ is determined at a given round k of trial t by optimizing over an optimization parameter set $\Phi(k, t)$ which comprises quantum communication component parameters. The optimization can be carried out via simulated annealing. Optimization hyperparameters include a maximum number of iterations $N_{it}(t)$ per round k at trial t and an initial annealing temperature T. Alternatively, the optimization can be carried out via, e.g., brute-force search or grid search.

The optimization parameter set $\Phi(k, t)$ includes component set parameters of the component set $s(k, t)$ and post-selection mask parameters, i.e. bit values, whether a measurement outcome is accepted or rejected. Since the component set $s(k, t)$ is compressed, its length $l_k(t)$ (corresponding to the number of phase shifters and beam splitters, described by one parameter each) satisfies $l_k(t) \leq k$. Hence, the optimization parameter set $\Phi(k, t) = \{\phi_1(k, t), \phi_2(k, t), \ldots, \phi_z(k, t)\}$ spans a z-dimensional parameter space, where $z = 1 + x + l_k(t)$ and x denotes a post-selection mask length. The additional dimension $+1$ corresponds to the intensity of the quantum states, particularly the initial quantum state $|\Psi_0\rangle$ prepared in the first communication device 40.

The optimization routine may start, e.g., at an initial point with number of photons equal to 1 for small values of $r_E \ll 1$ or equal to 1,000 otherwise, all phase values equal to $$\frac{\pi}{4}$$

and the postselection mask comprising only unit values.

Subsequently, one of the optimization parameters $\phi_m(k, t)$ is modified. Cf. Algorithm 1 below for a more detailed description. After that, for a resulting modified optimization parameter set $\Phi'(k, t)$, the key rate $$R_k^{(i)}(t)$$

is calculated via the security proof module 18.

If the key rate value $$R_k^{(i)}(t)$$

at iteration i is larger than the previous key rate $R_k(t)$ at step k, the key rate value $R_k(t)$ is updated, and the modified optimization parameter set $\Phi'(k, t)$ is accepted. Otherwise, the key rate value $R_k(t)$ is updated, and the modified optimization parameter set $\Phi'(k, t)$ is accepted only with probability $$p_k^{(i)}(t) = e^{\frac{-R_k(t)-R_k^{(i)}(t)}{T_i(t)}},$$ (23)

with effective simulated annealing temperature $$T_i(t) = \frac{N_{it}(t)}{i} T_{min}$$

and minimal temperature $T_{min}=0.09$. Subsequently, iteration i terminates.

The iterations are continued up to the maximum number of iterations $N_{it}(t)$ (e.g., $N_{it}(t)=19990+10t$), or until the current key rate $$R_k^{(i)}(t)$$

is larger than the previous maximum key rate $R(t-1)$, i.e., until $$R_k^{(i)}(t) > R(t-1).$$

In case $$R_k^{(i)}(t) > R(t-1),$$

the trial t ends, the component set $s_k(t)$ is set to $s_0(t+1)$, the maximum key rate is updated to $$R(t) = R_k^{(i)}(t),$$

and the reward value r(t)=1 is fed to the reinforcement learning agent.

If the optimization routine has not achieved a larger value than $R(t-1)$ after $N_{it}(t)$ iterations, then round/agent-environment interaction step k terminates, but trial t continues with the reinforcement learning agent adding one more quantum communication component with action $a_{k+1}(t)$ to the component set. However, in case of the last round of the trial (i.e., $k=k_{max}$, for example $k_{max}=20$), or a current component set length $l_k(t)$ already being maximal (i.e., $l_k(t)=L_{max}$, with the maximum component set length $L_{max}$ for example having a value of $L_{max}=8$), trial t finishes with the reward value r(t)=0 and the component set is reset to an empty set.

---

Algorithm 1: Simulated Annealing

Input: $\Phi(k, t)$, $R_k(t)$, $R(t-1)$, $T_i(t)$
Output: $\Phi(k, t)$, $R_k(t)$, $R(t-1)$, f
Set flag f indicating whether to interrupt annealer to false.
Select uniformly one of the optimization parameters $\phi(k, t)$ from the optimization parameter set $\Phi(k, t)$.
if $\phi(k, t)$ is intensity then
    change $\phi(k, t)$ to $\phi'(k, t) = \phi(k, t) + \delta_f$, where $\delta_{f\ \epsilon R}$ is sampled from interval
    (−100, 100) with uniform distribution;
else if $\phi(k, t)$ is phase then
    change $\phi(k, t)$ to $\phi'(k, t) = \phi(k, t) + \delta_f$, where $\delta_{f\ \epsilon R}$ is sampled from interval
    (−0.05, 0.05) with uniform distribution;
else $\phi(k, t)$ is postselection mask bit
    invert $\phi(k, t)$.
Calculate key rate $R_k^{(i)}(t)$ at iteration i, step k and trial t for modified optimization parameter set $\Phi'(k, t)$.
if $R_k^{(i)}(t)$ is larger than the previous maximum key rate $R(t-1)$ then
    terminate optimization,
    f = true,
    $R(t) = R_k^{(i)}(t)$,
    $\Phi(k, t) = \Phi'(k, t)$.
if $R_k^{(i)}(t)$ is larger than the highest key rate $R_k(t)$ during step k then
    terminate iteration i,
    $R(t) = R_k^{(i)}(t)$,
    $\Phi(k, t) = \Phi'(k, t)$;
else
    terminate iteration i,
    with probability $p_k^i(t) = e^{-(R_k(t)-R_k^{(i)}(t))/T_i(t)}$:
        $R(t) = R_k^{(i)}(t)$,
        $\Phi(k, t) = \Phi'(k, t)$.

---

Once the termination criterion is satisfied, an output maximum key rate R is returned, as well as an optimal component set s and an optimal setup parameter set $\phi$.

Figure 6:
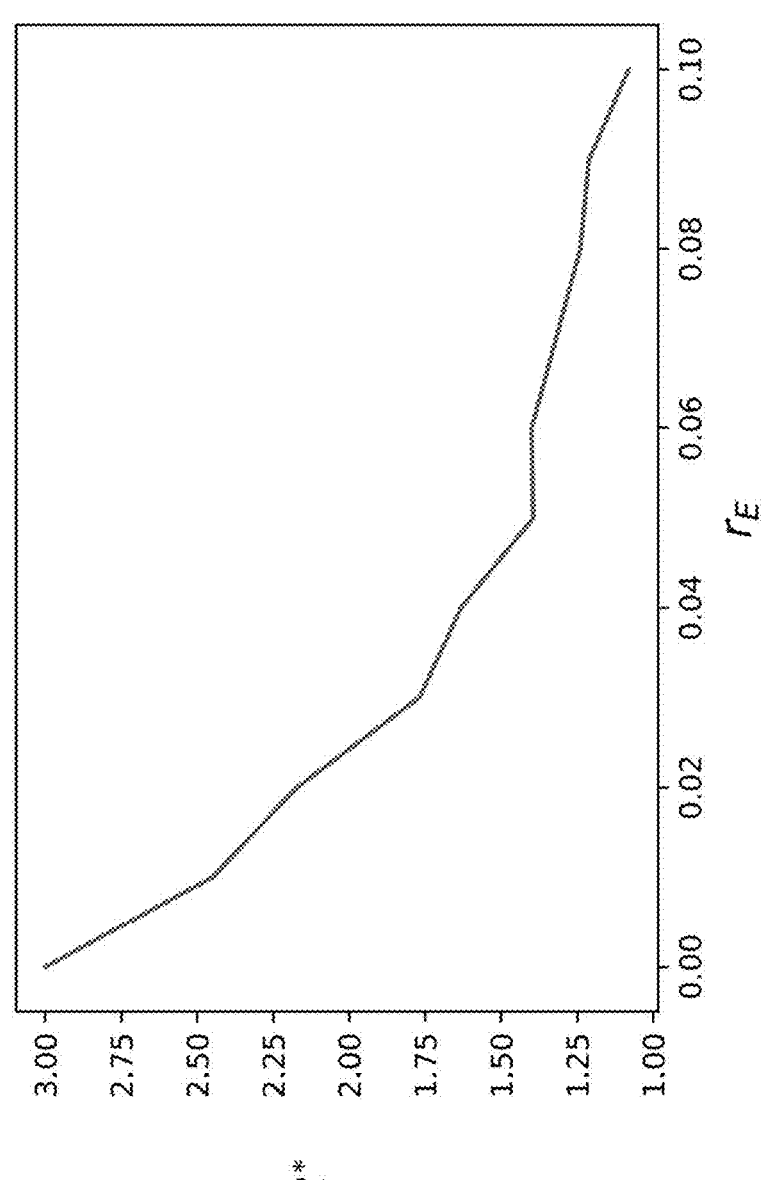
FIG. 6 shows a plot of an output key rate as a function of the fraction of intercepted intensity.

FIG. 6 shows a plot of the output key rate R as a function of the fraction $r_E$ of intercepted intensity (d=3 optical modes, K=3 states, and T=0.9). For every given $r_E$, the proposed method determines a different quantum communication setup with maximized key rate. For smaller values of $r_E$, the highest output key rate R can be achieved, whereas for larger values of $r_E$, lower key rates are determined.

Figures 7A, 7B, 7C:
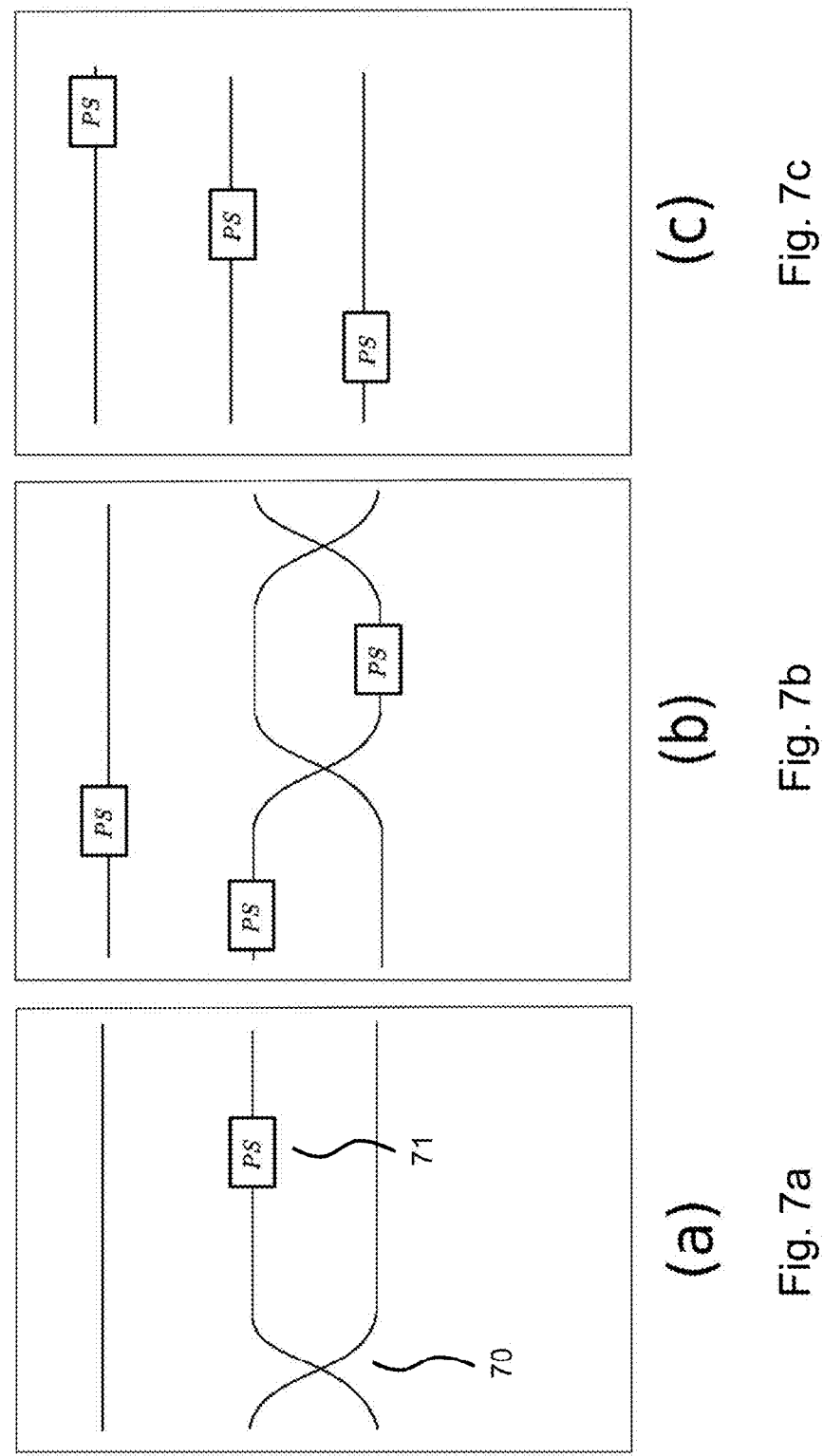
FIGS. 7*a*, 7*b*, and 7*c* show graphical representations of an embodiment of the quantum communication setups obtained by the method.

FIGS. 7a, 7b, and 7c show graphical representations of the quantum communication setups (optical setups) obtained by the method for d=3 optical modes and $r_E=0.1$. Optical setup (a), at the beginning of the reinforcement learning process, provides a key rate $R=10^{-5}$, optical setup (b) results in a key rate R=1.68, and optical setup (c), the optimal quantum communication setup, yields the highest key rate, the output key rate R=2.45.

FIG. 7a shows two optical components 70, 71, corresponding to beam splitter $BS_{23}$ and phase shifter $PS_2$, respectively. The optical components and setup parameters corresponding to these figures are as follows (cf. the table in FIG. 3).

| Setup | Optical components | setup parameters |
|---|---|---|
| FIG. 7a | $BS_{23}$, $PS_2$ | 0.25, 0.25, 0.26, 0.25 |
| FIG. 7b | $PS_2$, $PS_1$, $BS_{23}$, $PS_3$, $BS_{23}$ | 0.19, 0.42, 0.36, 1.98, 0.04, 0.33, 1.54 0.19, 0.49, 0.05 |
| FIG. 7c | $PS_3$, $PS_2$, $PS_1$ | 1.99, 0.21, 0.57, 1.99, 1.85, 0.44 |

After having established an optimal component set and an optimal setup parameter set, the corresponding quantum communication setup can be physically implemented for quantum key distribution.

The features disclosed in this specification, the figures and/or the claims may be material for the realization of various embodiments, taken in isolation or in various combinations thereof.

LIST OF REFERENCE SIGNS 10 meta-parameters
11 properties of quantum communication channel
12 hyper-parameters
13 learning agent module
13a environment
14 optimization module
15 compression module
16 physics simulation module
17 post-processing module
18 security proof module
19 output
19a feedback signal
20 simulation network
21 first nodes
22 second nodes
23 edges
40 first communication device
41 quantum random number generator
42 preparation unit
43 second communication device
44 eavesdropping device
45 measurement unit
50 eavesdropping beam splitters
51 further beam splitters
52 displacement operations
53 detectors
70, 71 optical components

The invention claimed is:

1. A method for determining a quantum communication setup, the method being carried out in a data processing system and comprising:

providing a component set indicative of a quantum communication setup comprising quantum communication components of at least one of a first communication device, a second communication device, and an eavesdropping device;

selecting an action of a set of actions each indicative of a further quantum communication component and each selectable with a selection probability depending on the component set and a reward value;

adding the selected further quantum communication component to the component set, thus generating an updated component set;

determining, from the updated component set, a quantum model comprising a quantum state of at least one of the first communication device, the second communication device, and the eavesdropping device;

determining, from the updated component set and the quantum model, a maximum key rate by optimizing over an optimization parameter set comprising quantum communication component parameters;

adjusting the reward value depending on the size of the maximum key rate in relation to a previous maximum key rate; and iteratively repeating the above steps until a termination criterion is satisfied, yielding an optimal component set and an optimal setup parameter set.

2. The method according to claim 1, wherein the quantum communication components comprise optical components, the optical components including at least one of beam splitters and phase shifters.

3. The method according to claim 1, wherein selecting the action is carried out by a reinforcement learning agent.

4. The method according to claim 3, wherein the reinforcement learning agent is a projective simulation agent.

5. The method according to claim 1, wherein the selection probability for selecting one of the set of actions corresponds to a reinforcement learning policy and depends on an exponential of a weight depending on the component set and the action.

6. The method according to claim 1, further comprising removing identical quantum communication components from the updated component set.

7. The method according to claim 1, wherein the quantum state comprises a plurality of optical modes, and wherein a random number comprising randomly generated informational bits is encoded using optical modes.

8. The method according to claim 1, wherein the quantum model further comprises quantum measurements carried out in at least one of the first communication device and the second communication device.

9. The method according to claim 1, further comprising:

determining, from the quantum model, a postselection set comprising measurement outcomes accepted by the first communication device and the second communication device, wherein the postselection set is determined by determining, for each measurement outcome, first information about a corresponding informational bit provided to the second communication device and leaked information about the corresponding informational bit provided to the eavesdropping device.

10. The method according to claim 1, wherein the maximum key rate is determined via a global optimization method that includes a simulated annealing.

11. The method according to claim 1, wherein the optimization parameter set comprises at least one of an intensity value, a phase shift value, and a postselection mask bit, and wherein the optimal setup parameter set comprises at least one of an optimal intensity value and an optimal phase shift value.

12. The method according to claim 1, further comprising: before adjusting the reward value, if the maximum key rate is less than or equal to the previous maximum key rate, iteratively including another further quantum communication component in the updated component set, updating the quantum model, the postselection set, and the maximum key rate until a maximum number of iterations is reached or the maximum key rate is greater than the previous maximum key rate.

13. The method according to claim 1, further comprising outside the data processing system:

preparing the quantum communication setup according to the optimal component set and the optimal setup parameter set.

14. A computer-readable, non-transitory storage medium storing instructions that, when executed by a processor of a data processing system, causes the processor to execute a method of designing a quantum communication system, the method comprising:

providing a component set indicative of a quantum communication setup comprising the quantum communication components of at least one of a first communication device, a second communication device, and an eavesdropping device;

selecting an action of a set of actions each indicative of a further quantum communication component and each selectable with a selection probability depending on the component set and a reward value;

adding the selected further quantum communication component to the component set, thus generating an updated component set;

determining, from the updated component set, a quantum model comprising a quantum state of at least one of the first communication device, the second communication device, and the eavesdropping device;

determining, from the updated component set and the quantum model, a maximum key rate by optimizing over an optimization parameter set comprising quantum communication component parameters;

adjusting the reward value depending on the size of the maximum key rate in relation to a previous maximum key rate; and iteratively repeating the above steps until a termination criterion is satisfied, yielding an optimal component set and an optimal setup parameter set.

15. A data processing system configured to determine a quantum communication setup, the data processing system comprising:

a hardware processor configured to perform steps including:

providing a component set indicative of a quantum communication setup comprising quantum communication components of at least one of a first communication device, a second communication device, and an eavesdropping device;

selecting an action of a set of actions each indicative of a further quantum communication component and each selectable with a selection probability depending on the component set and a reward value;

adding the selected further quantum communication component in the component set, thus generating an updated component set;

determining, from the updated component set, a quantum model comprising a quantum state of at least one of the first communication device, the second communication device, and the eavesdropping device;

determining, from the updated component set and the quantum model, a maximum key rate by optimizing over an optimization parameter set comprising quantum communication component parameters;

adjusting the reward value depending on the size of the maximum key rate in relation to a previous maximum key rate; and iteratively repeating above steps until a termination criterion is satisfied, yielding an optimal component set and an optimal setup parameter set.

* * * * *